April 6, 1965        D. D. TOWNE        3,176,812
ROTATING KEY POSITIVE CLUTCH
Filed Sept. 28, 1962

DELBERT TOWNE
INVENTOR.

BY
ATTORNEY

3,176,812
ROTATING KEY POSITIVE CLUTCH
Delbert D. Towne, Fort Atkinson, Wis., assignor to Kasten Mfg. Corp., Allenton, Wis., a corporation of Wisconsin
Filed Sept. 28, 1962, Ser. No. 226,988
1 Claim. (Cl. 192—71)

This invention relates to clutch construction, and more particularly to a clutch that may be readily disengaged upon emergencies.

A principal object of this invention is to provide a simple clutch mechanism which may be readily released by the operation of a simple release lever.

Another object is to provide a clutch characterized by a driven shaft supporting a rockable pin engageable with a driving shaft, and having a relieved portion adapted to move to a position for clutch disengagement.

Other and further objects of my invention will become more apparent as the description proceeds, when taken in conjunction with the drawing, in which.

Figure 1:
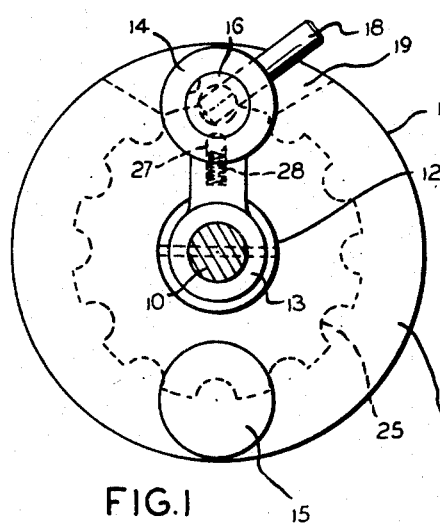
FIG. 1 is an elevational view of the clutch according to the present invention.
Figure 2:
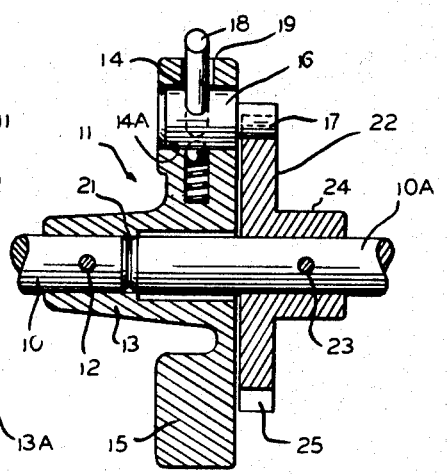
FIG. 2 is a transverse cross sectional view showing the clutch in driving position.

Referring now to the drawing, the clutch according to the present invention is adapted to cause a releasable connection between a drive shaft 10 and a driven shaft 10A. A driving clutch member 11 is fast to the drive shaft 10 by means of a pin 12.

The clutch member 11 has a hub 13 which is integral with a flange 13A, the latter supporting a release mechanism indicated generally by reference numeral 14 and a counter balance 15 for release mechanism 14.

Release mechanism 14 is rockable within a bore 14A in flange 13A, and includes a pin 16 provided with a relieved portion 17 integral therewith extending beyond flange 13A.

Release mechanism 14 is rockable between positions of engagement and release by means of an actuating finger 18 extending laterally from pin 16 and movable in a slot 19 adjacent the periphery of flange 13A of the clutch member 11.

Clutch member 11 and release mechanism 14 are adapted to provide a driving connection between drive shaft 10 and a driven shaft 20 which may be supported at its end within the hub 13 of clutch member 11.

Shaft 20 supports a driven clutch member 22 having a hub 24 secured to shaft 20 by means of a pin 23. Driven clutch member 22 has a plurality of semi-cylindrical recesses 25 around its entire periphery. Recesses 25 are in direct alignment with the relieved portion 17 extending from engagement pin 16.

Figure 4:
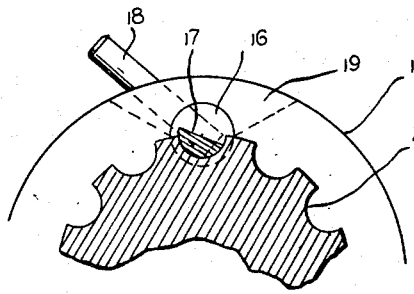
FIG. 4 is a transverse view showing the clutch in driving position.
Figure 5:
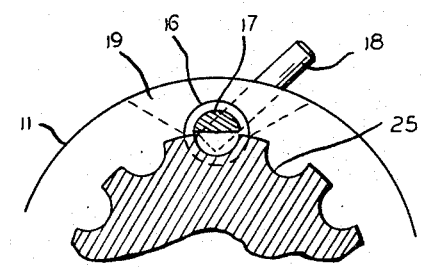
FIG. 5 is a view similar to FIG. 4, showing the clutch in disengaged position.

Referring to FIG. 4, it will be noted that when the pin 16, and with it the relieved portion 17 is rotated by the actuating finger 18, the unrelieved portion will engage one of the semi-cylindrical recesses 25, placing the two clutch members 11 and 22 in engagement with one another to rotate the driven shaft 20. When actuating finger 18 is moved to the position as seen in FIG. 5, relieved portion 17 will enable driven clutch member 22 to be disengaged.

Figure 3:
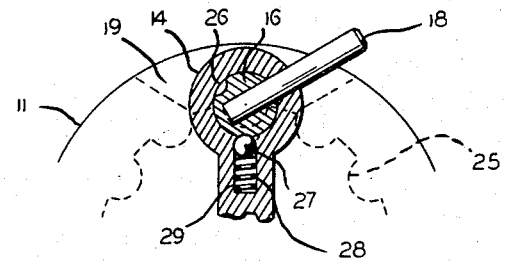
FIG. 3 is a cross sectional view showing the clutch in engaged position.

Structure is provided to lock actuating finger 18 and pin 16 in either the engage or disengaged position, and to this end pin 16 has two detent cavities 26, see FIG. 3, which cooperate with a ball detent 27 biased against detent cavity 26 by a compression spring 28 disposed within a recess 29 within driving clutch member 11.

When the actuating finger 18 is in the position seen in FIG. 4, the pin 16 engages one of the recesses 25 in the driven clutch member 22. When actuating finger 18 is moved to the other position seen in FIG. 5, the pin 16 will be disengaged from the recess 25, thereby disengaging the driving connection.

While I have shown a preferred embodiment of my invention, I am fully cognizant that many changes may be made in the shape and configuration of these parts without affecting their operation, and I accordingly reserve the right to make changes without departing from the spirit of my invention, as defined by the appended claim.

Having thus described my invention, what I claim and desire to secure by Letters Patent of the United States is:

A clutch construction comprising a first clutch member, a second clutch member mounted for rotation coaxially with said first clutch member and including a circular series of recesses coaxial with said clutch members, a clutch pin having a main part and a relieved end part, means mounting said clutch pin on said first clutch member for rotation relative thereto about an axis spaced from the axis of rotation of said clutch members and between a first position engaging said relieved end part in one of said recesses whereby driving engagement of the said members is established, and a second position clear of said recesses whereby said clutch members are disengaged, detent means on said main clutch pin part and on said first clutch member acting radially of said clutch pin mounting means for releasably holding said clutch pin in said first and second positions, an actuating finger extending from said clutch pin radially of said clutch pin mounting means and outwardly of the periphery of said first clutch member to afford shifting of said clutch pin notwithstanding said detent means, and a counterweight on said first clutch member in diametrically opposed relation to said pin to rotationally balance said first clutch member.

References Cited by the Examiner
UNITED STATES PATENTS

| | | | |
|---|---|---|---|
| 391,004 | 10/88 | Wright | 192—71 |
| 1,950,700 | 3/34 | Simmen | 192—71 |
| 2,553,466 | 5/51 | Morgan | 74—527 |
| 2,687,046 | 8/54 | Vorech | 74—527 |
| 2,687,101 | 8/54 | De Francisci | 192—29 |
| 2,846,039 | 8/58 | Requa et al. | 192—71 |
| 3,017,207 | 1/62 | Lloyd | 192—71 |
| 3,102,620 | 9/63 | Peddinghous et al. | 192—29 |

DAVID J. WILLIAMOWSKY, Primary Examiner.